United States Patent [19]
Maxwell

[11] Patent Number: 5,836,142
[45] Date of Patent: Nov. 17, 1998

[54] WHEEL ATTACHMENT CONNECTABLE TO WEED TRIMMERS AND THE LIKE

[76] Inventor: Eugene E. Maxwell, 4711—104th St., Kenosha, Wis. 53142-5612

[21] Appl. No.: 760,188

[22] Filed: Dec. 4, 1996

[51] Int. Cl.⁶ .................................................. A01D 75/10
[52] U.S. Cl. .............................. 56/12.1; 56/16.7; 56/17.2; 56/17.5; 30/276
[58] Field of Search .................................... 56/12.1, 16.7, 56/17.2, 17.5; 30/276

[56] References Cited

U.S. PATENT DOCUMENTS

| | | | |
|---|---|---|---|
| 4,033,098 | 7/1977 | Green | 56/17.5 |
| 4,182,100 | 1/1980 | Letter | 56/16.7 |
| 4,531,350 | 7/1985 | Huthmacher | 56/17.5 |
| 4,704,849 | 11/1987 | Gilbert | 56/17.5 |
| 4,829,755 | 5/1989 | Nance | 56/17.1 |
| 4,879,869 | 11/1989 | Buckendorf | 56/12.7 |
| 4,891,931 | 1/1990 | Holland | 56/16.7 |
| 4,922,694 | 5/1990 | Emoto | 56/16.7 |
| 5,092,112 | 3/1992 | Buckendorf | 56/17.5 |
| 5,263,303 | 11/1993 | Stroud | 56/12.7 |
| 5,408,816 | 4/1995 | Cartier | 56/17.5 |
| 5,450,715 | 9/1995 | Murray | 56/16.9 |
| 5,459,985 | 10/1995 | Gedert | 56/17.2 |
| 5,477,665 | 12/1995 | Stout | 56/16.7 |
| 5,626,006 | 5/1997 | Fricke, Sr. | 56/12.7 |

*Primary Examiner*—J. Woodrow Eldred
*Attorney, Agent, or Firm*—Whyte Hirschboeck Dudek SC; Timothy J. Ziolkowski

[57] ABSTRACT

A multiple frame wheel attachment connectable to a hand-held device, such as a gasoline powered weed trimmer. The wheel attachment has a pair of wheels attached to the ends of an axle and a pair of frame assemblies connecting the axle and wheels to the lawn trimmer. Both of the frame assemblies are mounted to the axle and to the shaft of the device. One of the frame assemblies is attached to the shaft near the operating unit of the device and the other frame assembly is attached to the shaft above the point where the first frame assembly is attached. The first and second frame assemblies support the shaft at two locations. The wheel attachment not only provides support during operation of the handheld device, but also functions as a stand so that when the device is not in use, it will remain in an upright position for storage, refueling service, and maintenance. The wheel attachment allows easy mobility of the operating unit over the work area. It may be used with a variety of handheld devices including lawn trimmers, lawn edgers, and metal detectors.

19 Claims, 1 Drawing Sheet

WHEEL ATTACHMENT CONNECTABLE TO WEED TRIMMERS AND THE LIKE

BACKGROUND OF THE INVENTION

This invention relates generally to a wheel attachment for handheld devices, and more particularly to a wheel attachment and frame assembly for attachment to a gasoline powered weed trimmer or similar type device.

Handheld devices, such as weed trimmers, lawn edgers, or metal detectors are often cumbersome to use because the operating unit of the device is functioning near ground level while the operator must remain upright and mobile in order to perform work using the device. A user is required to hold the device out from their body and maneuver the operating unit throughout the work area leading to back strain and various other physical stresses. In addition, the handheld device often needs to function over a large work area so a great deal of mobility is required. For example, when operating a lawn trimmer or a metal detector a user may move the device over a large distance in order to perform the desired task.

Another difficulty that currently exists with handheld devices like lawn trimmers and metal detectors is that there is not an adequate support system available where the user can leave the device unattended and have it remain in an upright position. Without an upright support system, the operator of the device is required to lay it on the ground when leaving it unattended. Also, refueling a gasoline powered weed trimmer as it lay on the ground can result in spilling the fuel, especially if the refueling canister is full. In addition, an operator has to bend over to retrieve the device in order to begin using it, leading to significant back stress.

Although support structures for handheld devices are known in the prior art, their effectiveness in adequately supporting a handheld device is questionable, especially where the handheld device has a significant weight in the handle, such as a gas engine. One such structure is disclosed in U.S. Pat. No. 5,450,750. This patent involves a wheel assembly attached to a handheld device that includes only one frame member attached near the operating unit of the device. This particular wheel assembly is capable of supporting the shaft of the device at only one location. Another structure disclosed in U.S. Pat. No. 4,829,755 provides a wheeled support having only one frame which is adjustable along the shaft of the handheld device. As with the previous patent, this device is capable of supporting the shaft in only one location and therefore, is somewhat unstable. Another device disclosed in U.S. Pat. No. 4,704,849 takes the form of a comprehensive frame assembly having wheels both forward and rearward of the operating unit. However, because this operating unit is surrounded by wheels at its four corners, it does not provide adequate accessibility of the operating unit to the work area.

Further examples of prior art wheel attachments include U.S. Pat. No. 5,263,303; 5,092,112, 4,879,869, and 4,182,100. However, none provide a support structure which supports the shaft of a handheld device in more than one location, can function as a stand when the device is not in use even if the device has a significant amount of weight in the handle, nor allows adequate accessibility of the operating unit to the work area.

SUMMARY OF THE INVENTION

The present invention overcomes the aforementioned problems by providing a wheel attachment connectable to a handheld device that supports the shaft of the device in more than one location while still allowing almost total exposure of an operating unit to a work area. In addition, the present invention also functions as a stand for a handheld device so that when the device is left unattended by an operator, it will remain in an upright position providing easy access for refueling, maintenance and service.

The present invention provides a wheel attachment connectable to a handheld device. The device has an operating unit at one end which is connected by a shaft to a handle at the opposite end. The wheel attachment has a pair of wheels attached to the ends of an axle, and the axle is attached to two frame assemblies. The first frame is attached to the axle at one end and to the shaft of the handheld device near the operating unit at the opposite end. The second frame is also attached to the axle at one end and to the shaft at the opposite end. The second frame is attached to the shaft at a point above the attachment location of the first frame.

A principal object of the invention is to provide a wheel attachment connectable to the handheld device so that the device can be operated without a great deal of physical strain to the user.

Still another object of the invention is to provide a wheel attachment connectable to the handheld device which allows the user to perform smooth and even movements with the device during operation.

An additional object of the invention is to provide a wheel attachment which supports the handheld device during operation and still allows the operating unit of the device generous access to the work area.

Another object of the invention is to provide a wheel attachment which is conveniently connectable to the handheld device.

Yet another object of the invention is to provide a wheel attachment connectable to the handheld device that is easy and inexpensive to manufacture and is compact for shipping and storage.

Another object of the invention is to provide a wheel attachment connectable to the handheld device which provides support in such a manner that the handheld device may remain upright when not in use or for refueling, maintenance and service.

Still another object of the invention is to provide a wheel attachment connectable to the handheld device that provides support to two critical sections of the shaft of the device during operation.

Various other features, objects, and advantages of the present invention will be made apparent from the following detailed description and the drawings.

BRIEF DESCRIPTION OF THE DRAWINGS

The drawings illustrate the best mode presently contemplated for carrying out the invention.

In the drawings.

DETAILED DESCRIPTION OF THE PREFERRED EMBODIMENT

Figure 1:
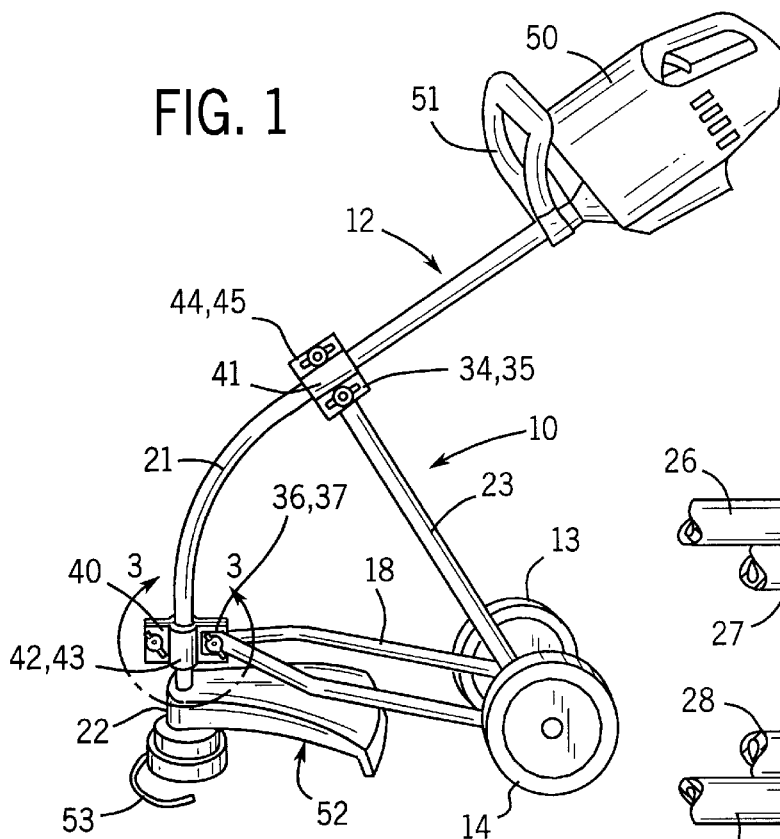
FIG. 1 is a perspective view of a wheel attachment according to the present invention connected to a lawn trimmer powered by a gasoline engine.
Figure 2:
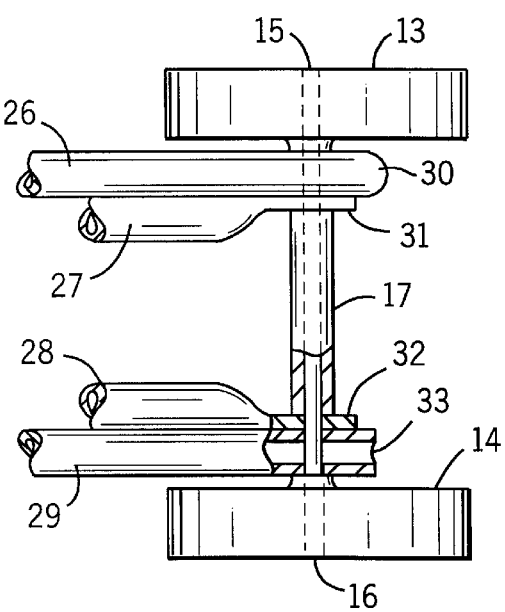
FIG. 2 is a top view of a portion of FIG. 1 showing the rear section of the wheel attachment of the present invention.

Referring now to the drawings, particularly FIGS. 1 and 2, a handheld device such as conventional gasoline powered lawn trimmer 12 is supported by a wheel attachment 10. Trimmer 12 has a gas engine 50, handle 51, shield 52 and cutting cord 53. Wheel attachment 10 has a pair of wheels 13, 14 attached to ends 15, 16 of axle 17.

A first frame 18 is attached at one end to axle 17. The opposite end of first frame 18 is attached to shaft 21 in close proximity to operating unit 22 of lawn trimmer 12. A second frame 23 is also attached at one end to axle 17. The opposite end of second frame 23 is attached to shaft 21 at some point along shaft 21 above the attached location of first frame 18 so as to support lawn trimmer 12 when unattended. The wheel attachment 10 allows such a handheld device to be rolled from location to location rather than carried by an operator. Such use is desirable both during operation and in between operations. In addition, wheel attachment 10 operates as a stand so that a handheld device may remain in an upright position when not in use for refueling, maintenance and service.

The second frame 23 can be attached to any portion of shaft 21 as long as it is at a point on shaft 21 above the location where first frame 18 is mounted and provides support to the handheld device. These locations include, but are not limited to, the mid-point of shaft 21 as well as a section of shaft 21 near handle 50.

In a preferred embodiment of this invention, first frame 18 and second frame 23 are of an A-frame construction such that both frames have a single point of contact with shaft 21 and dual points of contact with axle 17. Referring to FIG. 2, first frame 18 comprises support members 26, 27 and second frame 23 comprises support members 28, 29. Support member 26 has a first end 30 and a second end 34, while support member 27 has a first end 31 and a second end 35. In addition, support member 28 has a first end 32 and a second end 36, while support member 29 has a first end 33 and a second end 37. Every end of all support members has at least one opening. Axle 17 is mounted through the openings of every first end. Second end 36 of support member 27 and second end 37 of support member 28 are connected to shaft 21 near the operating unit of the handheld device. Second end 34 of support member 26 and second end 35 of support member 29 are also connected to shaft 21 but at a location above the attachment location of support members 26, 29.

Devices within the prior art either provide support to the shaft of the device in only one location or access of the operating unit to the work area is inhibited. The dual frame configuration of the wheel attachment of the present invention is capable of providing support to the handheld device at two locations while allowing the operating unit generous access to a work area. Support to the shaft of the device in two locations is critical because there is more than one vulnerable area on the device. One area of concern on the shaft is near the operating unit where a great deal of force can be generated to the shaft of the device through the operating unit via work load or an impact. Another point on the shaft susceptible to forces exerted upon it is the area near the handle where, as in a gasoline powered lawn trimmer, an engine is often mounted on the handle.

A gasoline engine mounted on the handle may cause significant stress to the shaft if the shaft is supported only near the operating unit and may cause back pain to the user having to carry such weight during extended use. The device may be damaged by an individual leaning on the handle, especially when a gasoline engine or some other item is situated there. A great deal of force is exerted on the shaft when even a minimal amount of force is applied at the handle.

Another area of concern arises when the shaft of the device is supported only near the handle. Damage to a handheld device may occur when using this type of support system if significant force or impact is exerted on the operating unit. The present invention solves the support problem by providing support to the shaft of the device at more than one location.

Providing support at two points on the shaft also allows the wheel attachment to act as a stand while the device is not in use. When the shaft is only supported near the operating unit, the handheld device is unstable and may tip if the device has an extremely heavy handle or is inadvertently bumped. When this wheel attachment is used, an operator may leave the device unattended and it will remain in an upright position. This feature is especially important in the case of a lawn trimmer powered by a gasoline engine. An operator can fill the tank of the engine with gasoline while the trimmer remains in an upright position avoiding spillage and other pitfalls. The wheel attachment is also useful for performing maintenance and service to the engine.

Figure 3:
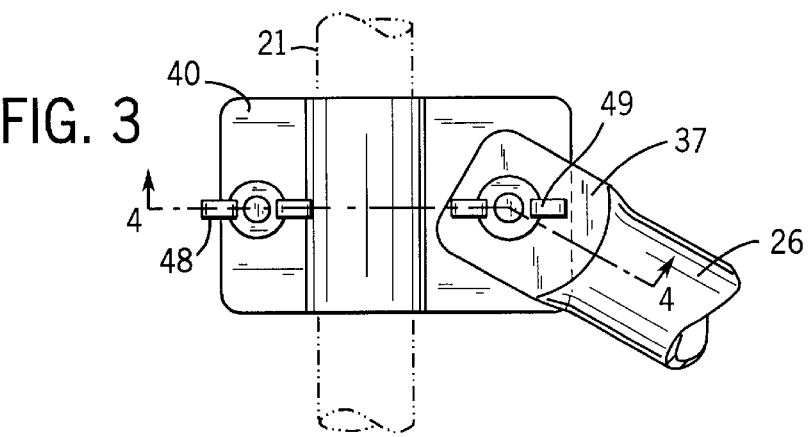
FIG. 3 is a side view of a portion of FIG. 1 taken along line 3—3 of FIG. 1.
Figure 4:
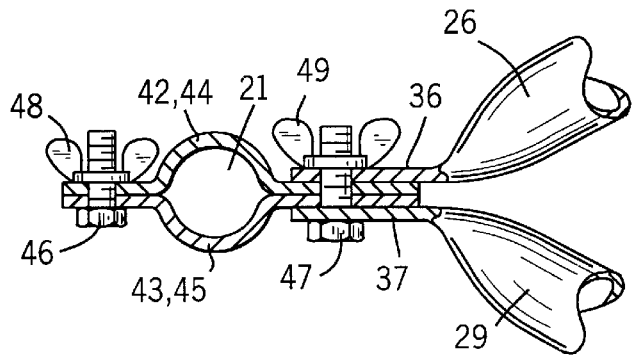
FIG. 4 is a sectional view taken along line 4—4 of FIG. 3.

In the preferred embodiment of this invention, as shown in FIG. 3, first clamp 40 is adjustable along shaft 21 and connects first frame 18 to shaft 21. Similarly, second clamp 41, FIG. 1, is also adjustable along shaft 21 and connects second frame 23 to shaft 21 above the attached location of first frame 18. Referring to FIG. 4, first clamp 40 comprises a pair of U-shaped brackets 42, 43 and second clamp 41 comprises a pair of U-shaped brackets 44, 45. First frame 18 is attached to shaft 21 by placing U-shaped brackets 42, 43 on either side of shaft 21. Using bolts 46, 47 and wing nuts 48, 49 support members 26, 29 of first frame 18 are attached to shaft 21 via U-shaped brackets 42, 43.

Mobility is critical in such devices as lawn trimmers, lawn edgers and metal detectors. This wheel attachment allows for easy maneuverability of a handheld device. The operating unit of the device is generously exposed allowing an operator to move the device throughout a work area without interference from a frame or wheel assembly.

In the preferred embodiment, the frame assemblies are constructed of hollow tubing wherein the ends of the tubes are compressed and have holes drilled therethrough for attachment to shaft 21 and axle 17. It is contemplated that various alternative arrangements can be made in the construction of the frame assemblies for manufacturability. Similarly, clamps 40, 41 may be constructed of a hinged clamp that would only require a single bolt for attachment to the shaft.

From the foregoing it will be apparent to those skilled in the art that a variety of changes and modifications, outside from those expressly stated, can be made without departing from the spirit of this invention and the scope of the appending claims.

What is claimed is:

1. A wheel attachment connectable to a handheld device having a shaft with an operating unit at an operating end and a handle at a handle end, comprising:

an axle having two ends;

a pair of wheels attached to the ends of the axle;

a first frame having a first end and a second end, the first end attached to the axle and the second end attached to the shaft of the handheld device;

a second frame having a first end and a second end, the first end attached to the axle and the second end attached to the shaft at a point above the attached location of the second end of the first frame; and wherein the first frame and second frame are A-shaped such that both frames have a single point of contact with the shaft of the device and multiple points of contact with the axle.

2. The wheel attachment of claim 1 wherein the first frame is attached to the shaft near the operating end and the second frame is attached at a midpoint of the shaft.

3. The wheel attachment of claim 1 wherein the first frame and second frame are each comprised of two support members having a first end and a second end with at least one opening in each end, whereby the axle is mounted through the openings in the first end of the support members, and the second end of the support members are connectable to the shaft of the device.

4. The wheel attachment of claim 1 further comprising:
a first clamp comprising a pair of U-shaped brackets connecting the first frame to the shaft;
a second clamp comprising a pair of U-shaped brackets connecting the second frame to the shaft.

5. The wheel attachment of claim 4 wherein the U-shaped brackets are each clamped to the shaft of the device with a pair of bolts and wing nuts.

6. The wheel attachment of claim 1 wherein the handheld device is a weed trimmer having a gasoline engine attached to the handle end.

7. A wheel attachment for a handheld device having a shaft, the handheld device normally operated by a user standing in an upright position where an operating unit is near ground level at an operating end of the shaft and a handle for gripping the handheld device during operation is at a handle end of the shaft, the wheel attachment comprising:
an axle having two ends;
a first A-shaped frame comprising a pair of tubes, the pair of tubes each having compressed first and second ends, the first ends having openings therein for pivotally connecting the first A-shaped frame to the axle at two points, the second ends having openings therein for connecting the first A-shaped frame to the shaft at a third point;
a second A-shaped frame comprising a pair of tubes, the pair of tubes each having compressed first ends and second ends, the first ends having openings therein for pivotally connecting the second A-shaped frame to the axle at two points, the second ends having openings therein for connecting the second A-shaped frame to the shaft at a third point above the location where the first A-shaped frame is connected to the shaft; and
a pair of wheels attached to the ends of the axle.

8. The wheel attachment of claim 7 wherein the first A-shaped frame is connected to the shaft at a third point located near the operating end of the shaft for providing lateral support to the operating unit of the handheld device during operation.

9. The wheel attachment of claim 7 wherein the second A-shaped frame is connected to the shaft above the location where the first A-shaped frame is connected to the shaft and near the handle end of the shaft for providing vertical support to the handle of the device.

10. The wheel attachment of claim 7 wherein the pair of wheels attached to the ends of the axle are for rolling the device during operation and in between operations from one location to another.

11. The wheel attachment of claim 7 wherein the first A-shaped frame and the second A-shaped frame are connected to the shaft allowing the wheel attachment to operate as a stand and the handheld device to remain in an upright position during periods of inactivity.

12. The wheel attachment of claim 11 wherein the wheel attachment operates as a stand allowing for maintenance of the handheld device.

13. The wheel attachment of claim 7 wherein the handheld device is a gasoline powered lawn trimmer, the first A-shaped frame and the second A-shaped frame are connected to the shaft such that the wheel attachment functions as a stand allowing the trimmer to remain in an upright position for fueling.

14. The wheel attachment of claim 7 wherein the first A-shaped frame is connected to the shaft near the operating end of the handheld device and the second A-shaped frame is connected to the shaft near the handle end of the handheld device, and wherein the handheld device is a gasoline powered trimmer and the wheel attachment supports the lawn trimmer in an upright position as well as allowing the trimmer to be moved from location.

15. A wheel attachment connectable to a handheld device having a shaft with an operating unit at an operating end and a handle at a handle end, comprising:
an axle having two ends;
a pair of wheels attached to the ends of the axle;
a first frame having a first end and a second end, the first end attached to the axle and the second end attached to the shaft of the handheld device;
a second frame having a first end and a second end, the first end attached to the axle and the second end attached to the shaft at a point above the attached location of the second end of the first frame; and
wherein the first frame and second frame are each comprised of two support members having a first end and a second end with at least one opening in each end, whereby the axle is mounted through the openings in the first end of the support members, and the second end of the support members are connectable to the shaft of the device.

16. The wheel attachment of claim 15 wherein the first frame is attached to the shaft near the operating end and the second frame is attached at a midpoint of the shaft.

17. The wheel attachment of claim 15 wherein the first frame and second frame are A-shaped such that both frames have a single point of contact with the shaft of the device and multiple points of contact with the axle.

18. The wheel attachment of claim 15 further comprising:
a first clamp comprising a pair of U-shaped brackets connecting the first frame to the shaft; and
a second clamp comprising a pair of U-shaped brackets connecting the second frame to the shaft.

19. The wheel attachment of claim 15 wherein the handheld device is a weed trimmer having a gasoline engine attached to the handle end.

* * * * *